F. RAUCHWETTER.
CALCULATING MACHINE.
APPLICATION FILED FEB. 24, 1912.

1,127,677.

Patented Feb. 9, 1915.
6 SHEETS—SHEET 1.

Fig. 1.

Witnesses:

Inventor:

F. RAUCHWETTER.
CALCULATING MACHINE.
APPLICATION FILED FEB. 24, 1912.

1,127,677.

Patented Feb. 9, 1915.
6 SHEETS—SHEET 6.

F. RAUCHWETTER.
CALCULATING MACHINE.
APPLICATION FILED FEB. 24, 1912.

1,127,677.

Patented Feb. 9, 1915.
6 SHEETS—SHEET 6.

UNITED STATES PATENT OFFICE.

FRANZ RAUCHWETTER, OF STEGLITZ, NEAR BERLIN, GERMANY.

CALCULATING-MACHINE.

1,127,677.   Specification of Letters Patent.   Patented Feb. 9, 1915.

Application filed February 24, 1912. Serial No. 679,578.

*To all whom it may concern:*

Be it known that I, FRANZ RAUCHWETTER, a subject of the German Emperor, residing at Schildhornstrasse 22, Steglitz, near Berlin, Germany, have invented certain new and useful Improvements in Calculating-Machines, of which the following is a specification.

This invention relates to improvements in or modifications of the invention for which I obtained Letters Patent of the United States No. 996,523, dated 27th June 1911.

In the specification of my aforesaid patent, a calculating machine especially intended for effecting multiplication is described, in which the movement of a toothed rack through a distance proportional to the product of two simple numbers is taken up by a so-called tens and units mechanism and transferred to a counter. In my aforesaid patent, the tens and units mechanism consists of two co-axially mounted sectors, one of which is moved through a distance proportional to the units digits, while the other is moved through a distance proportional to the units of the tens. The drawback with the foregoing construction is that it is necessary for two sectors (that is the units and the tens sectors) to act upon each counting wheel, and this leads to great complexity of construction in the case of machines made for a large number of numerical places. A further drawback is that, as the transfer of readings to the counter from the units and tens takes place separately, the counter must be constructed as a differential mechanism so that the carrying over of the tens can be effected in the counter itself.

The object of my present invention is to avoid these drawbacks and to effect a material simplification in the units and tens mechanism and in the counter.

The principle of the invention consists in causing each toothed rack 6 of the specification of my aforesaid principal patent, to transmit, through a suitable mechanism, to the next toothed rack 6, that is to the rack belonging to the next higher numerical place a movement equivalent to one tenth of the movement of the first mentioned rack so that when any one of the racks is moved through a certain distance the corresponding rack of the next higher numerical place moves through a distance which in that numerical place represents in units the number of units of the tens of the movement of the rack of the preceding numerical place. It will be remembered, as before stated, that each rack 6 moves through a distance proportional to the product of any two simple numbers so that the greatest distance any rack can be moved is that produced by the product of 9×9 that is to say 81 units, the units in any particular case being arbitrary according to the dimensions and gearing of the parts but of course being uniform throughout any particular machine. For instance in some machines the unit of movement of each rack may be a millimeter. Suppose for the sake of example that a mechanism has been moved through 25 units corresponding to the product of 5×5, then the toothed rack belonging to the next higher numerical place and consequently the mechanism belonging thereto is moved through 2.5 units. With the construction described in connection with the machine forming the subject matter of my aforesaid patent, for registering the units in each numerical place the stepped disk of the first mechanism in the particular example under consideration is turned back through 5 units so that with the improved construction the mechanism of the next higher numerical place is turned back through a tenth part that is through 0.5 units; so that although in the first instance the mechanism of the higher numerical place had been moved through 2.5 units, by the setting back and consequent registration of the 5 in the first numerical place, the mechanism and rack of the next higher numerical place are set back through 0.5 units in that numerical place, and consequently the mechanism of the higher numerical place is in such a position that when it is itself set back it registers 2. thus exhibiting 25 at the counter. By the before described interconnection between the neighboring mechanism the necessity is avoided of a special arrangement of tens sectors next to the units sectors in each numerical place. Moreover, the necessity is avoided of carrying over the tens in the mechanisms themselves, and consequently the necessity of making the counter as a differential mechanism.

The invention also comprises various constructional improvements which will be more fully described and claimed hereafter.

In the drawings accompanying this specification two methods of carrying the invention into effect are illustrated.

As in the case of the machine forming the subject of my aforesaid patent, 1 are lever arms which represent the digits 0 to 9. These arms may be set by the multiplicand keys 2, carrying the digits 0 to 9, into ten different positions corresponding to these digits, by rotating the said arms about the point 0. The levers 1 are formed, as previously described with reference to the aforesaid patent, into two sectors 78 at their ends, in the notches 79 between the teeth of which, a locking rod engages in order to lock the lever in the set position.

8 is the sliding frame, which is slidable upon the levers 1 with the intervention of a parallel link motion 10, 11, 12, 13 which enables the frame to be lowered. This frame operates the rod 6¹ by means of the arm 99, thereby actuating the rack 6 of the tens and units mechanism. The lowering of the frame 8 is effected, in one of the ways illustrated in the specification of the aforesaid patent, from the multiplicand key 7.

While, according to the construction described in the specification of the former patent, the actuating rack 6 and the rod 6¹ form a rigid whole; with the present construction the racks 6 which are moved through a distance proportional to the products of the simple numbers, are not directly connected so as to be rigid with the rod 6¹, set by the multiplicand keys, but they are connected by means of bent levers 4, 5, mounted upon pivots 3 of these rods. The arm 4 of one of the bent levers just described engages by means of a pivot 14 in the horizontal slot 15 of a cross arm 16. As long as this cross arm 16 remains at rest, the toothed rack 6 is in rigid connection with the sliding piece 6¹, as the bent lever 4, 5 cannot move, and, therefore, the parts 6 and 6¹ move together. If, however, the cross arm 16 is lowered, the sliding rod 6¹ remaining fixed, then the bent lever 4, 5 is swung over around the pivot 3, which is now fixed, and thereby moves the toothed rack 6 through a distance proportional to the lowering of the cross arm. This lowering of the cross arm is effected by the movement of the toothed rack 6 of the numerical place next below that under consideration, in the following manner: Upon the vertical arm of the cross arm 16 is a pivot 17 which engages in a curved slot 18 of a disk 20 in connection with the toothed locking ring 19 of the previous numerical place. This curved slot which takes the place of the stepped disk of the former construction, is so formed, that on turning the ring 19 through a distance proportional to ten units of movement of the rack 6, the cross arm 16 sinks so that the bent lever 4, 5 of the next higher mechanism, and consequently the rack 6 thereof is moved through unit distance, that is through a distance corresponding to the tenth of the distance moved by the toothed rack 6 of the previous numerical place. For example, supposing the preceding toothed rack has been moved through 63 units of distance the product of the simple numbers 7 and 9 units of distance, then the next succeeding one is moved through 6.3 units of distance. To complete the setting of the parts the ring 19, which is provided with locking teeth as described in the specification of the former patent, is now moved so as to turn it backward by three. This is effected by means of the sector 21 having a recess 22. It may be mentioned that as many sectors 21 are provided as there are numerical places, one such sector being mounted opposite each numerical place and that the recesses 22 of the successive sectors 21 are so displaced with respect to one another that when the shaft carrying the sectors is rotated they operate successively upon the corresponding notched wheels beginning at the lowest numerical place. The spindle carrying the sectors is connected by any suitable intermediate gearing with the principal actuating spindle (operated from the handle 131 see Fig. 25 of the original specification) in such a way that, when this handle is operated, each sector 21 is rotated through an angle of 360 degrees in the direction of the arrow Fig. 1. The ring 19 is thus set back by the required amount so that the following cross arm 16 and the following toothed rack 6 are moved back through 0.3 units. Consequently, the total movement of the following toothed rack in the example under consideration is 6 units, that is exactly the number of the tens of the movement of the preceding toothed rack. The result is that, at each movement of one of the toothed racks 6, by means of the slide rods 6¹, this supplementary movement of the rack is produced from the preceding toothed rack, by means of the interconnection just described between the two neighboring mechanisms. The transmission of the movement of the toothed racks 6 to the counter is then effected by means of a toothed sector 23 which engages the intermediate wheel 24 of the counter 25. For each toothed locking ring 19, a sector 21 is provided, and a recess 22 in each of such sectors. Each of these recesses in succession is somewhat larger than the recess in the disk for the next preceding numerical place, the result being that the locking toothed rings 19 when the main actuating spindle is turned are turned back through the space representing the units through which they have been previously turned, and this setting back of the units takes place successively in each numerical place, and is transmitted by means of the gearing described in the former specification to the sectors 23 of the numerical places also in succession. The sectors 23 in turn gear with the counter mechanism so that each sector in succession transmits its movement to the counter and the carrying over of the tens in the counter is effected from any one of the lower to the next higher numerical place.

Figure 1:
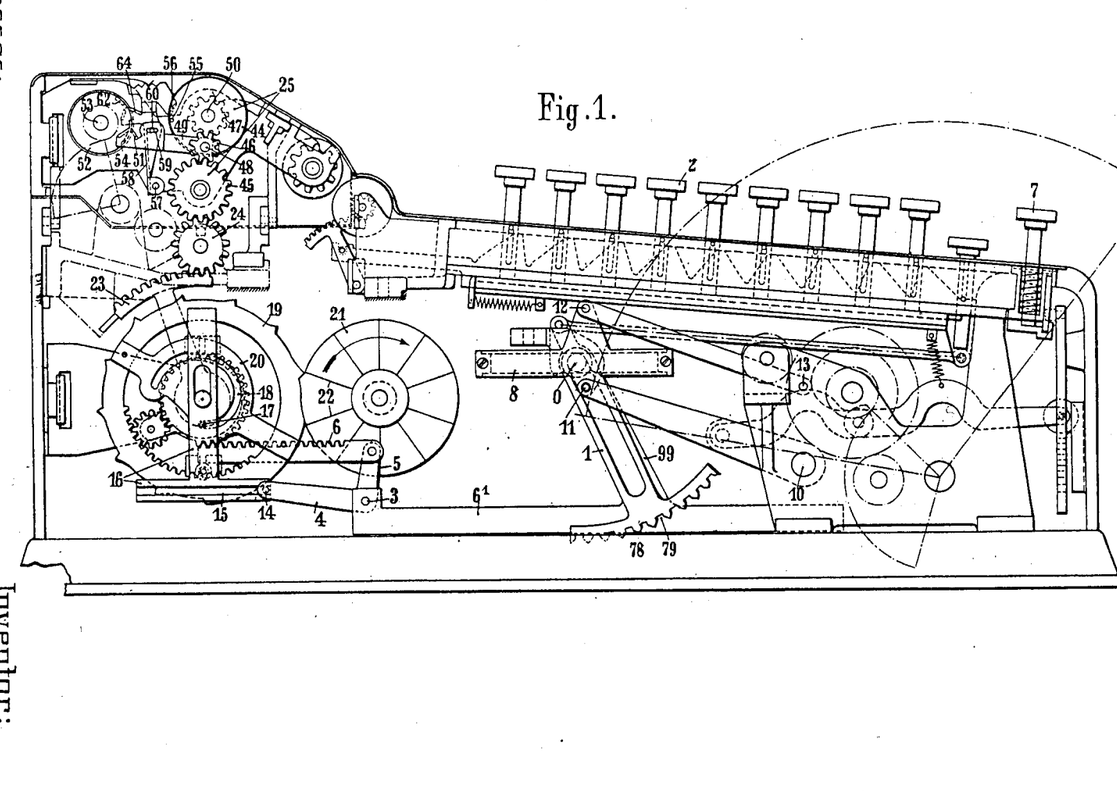
Figure 1 shows the general arrangeme… of a machine with the new tens and units mechanisms, and one form of the corresponding counter.
Figure 2:
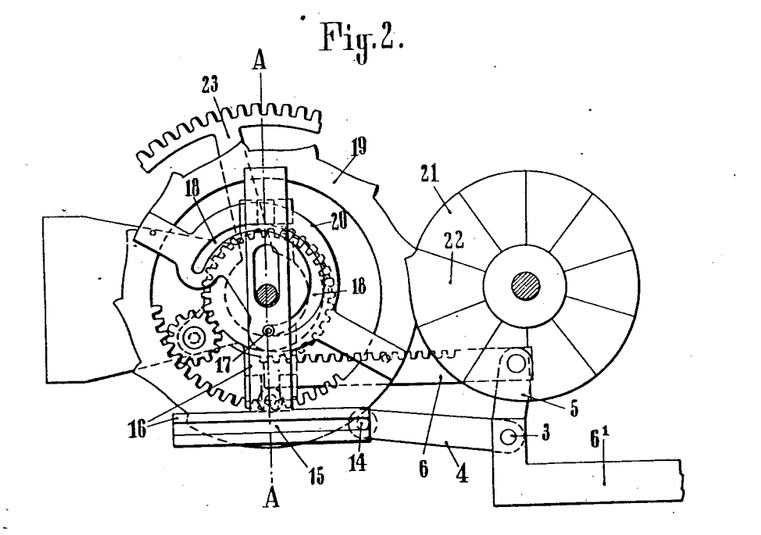
Fig. 2 shows a tens and units mechanism constructed in the same way as that illustrated at Fig. 1, but shown to an enlarged scale.
Figure 3:
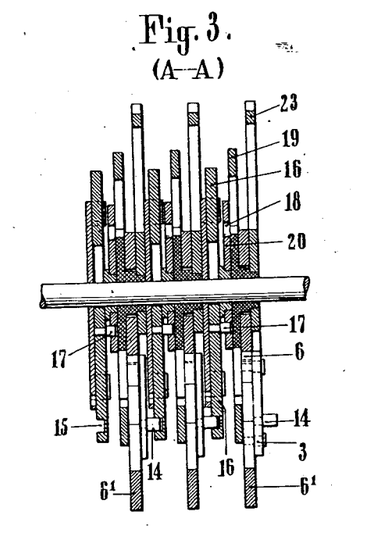
Fig. 3 is a section on the line A, A Fig. 2.
Figures 4, 5, 6:
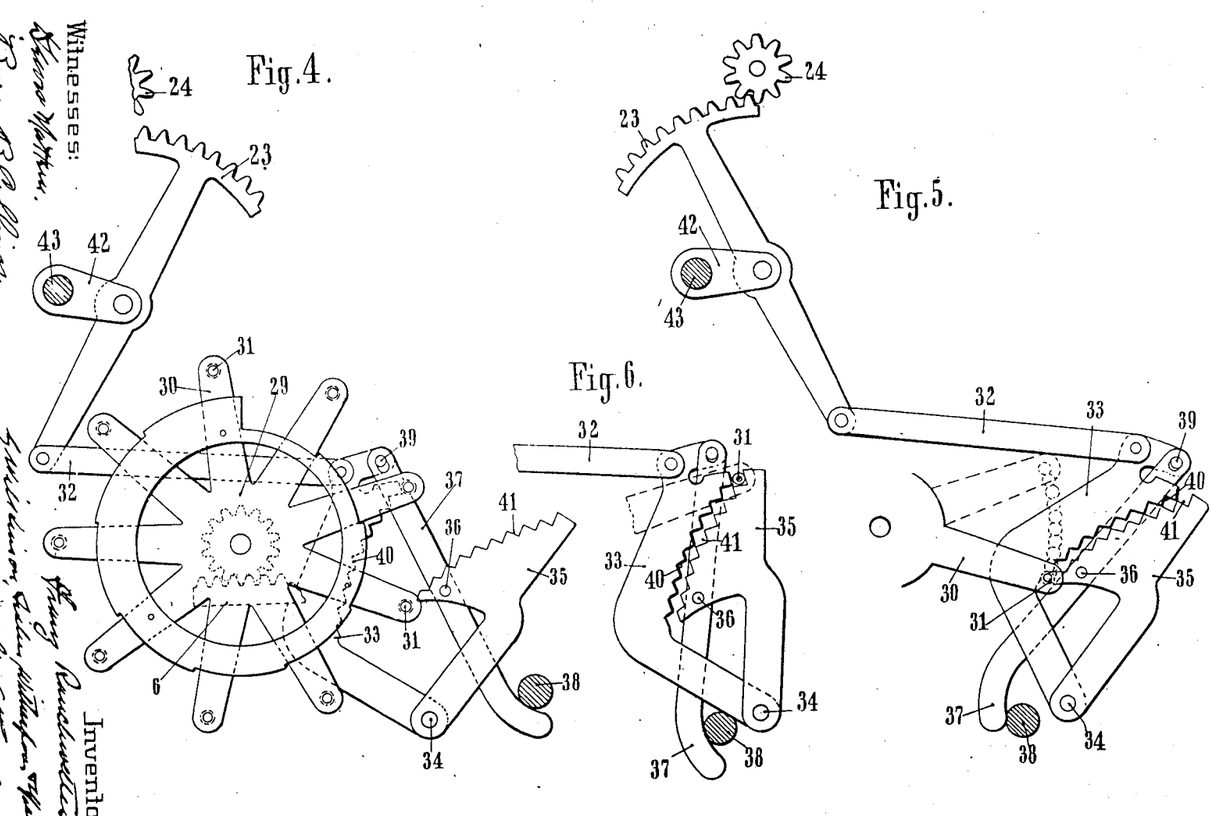
Fig. 4 is a view of a second method of constructing the new tens and units mechanism.
Fig. 5 shows the same mechanism, in a different position, with the stepped wheel removed.
Fig. 6 shows the same mechanism, with the stepped wheel removed and with the toothed sector itself in a different position.
Figure 7:
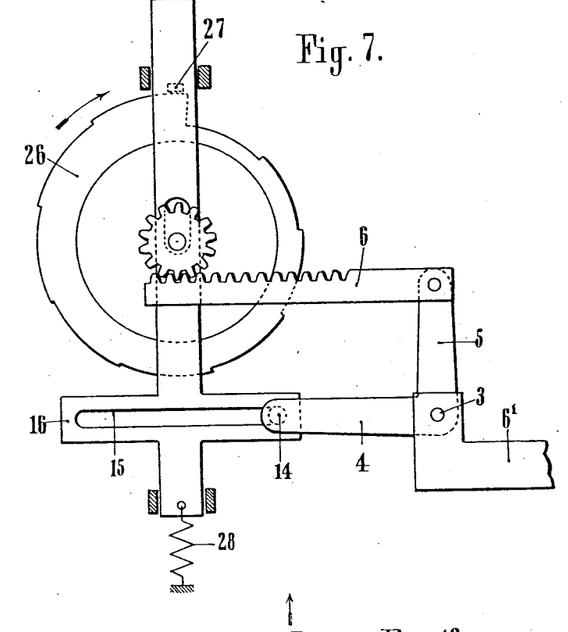
Fig. 7 is a view showing the connection between the actuating rack of one mechanism and the next succeeding mechanism.
Figure 11:
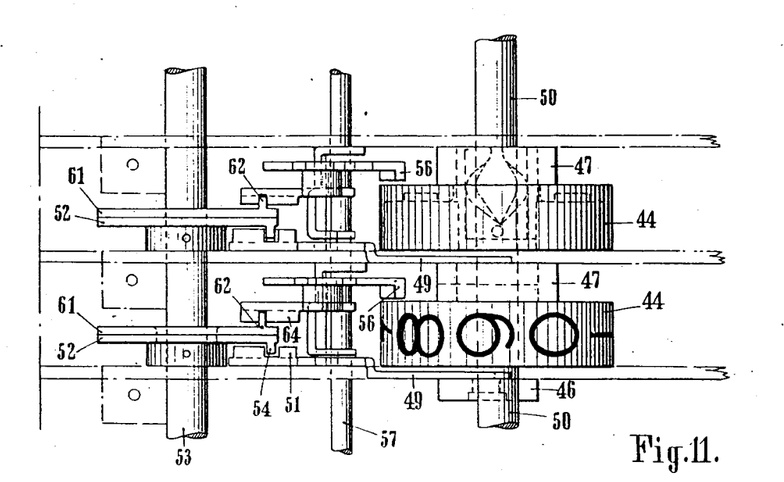
Fig. 11 is a plan of two counter elements.

The second method of carrying out the construction of the tens and units mechanism with a toothed sector which engages with the toothed wheel of the counter mechanism is illustrated at Figs. 4 to 7. In this case also, as with the first method of carrying out the invention, 6 is the toothed rack for actuating the mechanism, which is coupled with the rod 6¹ by a bent lever 4, 5 turning upon the pivot 3. This bent lever engages by means of its horizontal arm 4, provided as before with a pivot 14 in the guiding groove 15 of the cross arm 16, movable in a vertical direction, so that when the cross arm is at rest, the toothed rack 6 is rigidly connected to the rod 6¹, while conversely when the cross arm is lowered, but the sliding rod 6¹ is kept still, the bent lever is swung over, and so the toothed rack 6 is moved through a distance proportional to the downward movement. The downward movement of the cross arm 16 is in this case effected from the mechanism of the previous toothed rack 6 by means of a stepped disk or stepped ring 26 rigidly coupled to the next preceding mechanism, a projection or the like 27 in connection with the cross arm 16 resting upon the steps of the ring 26 and a spring 28 being provided for normally pulling the cross arm downward. When the next preceding mechanism is turned through a distance of 10 units, the stepped disk 26 is turned through one step and then the catch or projection 27 falls, under the action of the spring 28, upon the next succeeding step, that is to say the cross arm 16 is lowered through a distance which causes the toothed rack 6 of the next succeeding numerical place to be moved through unit distance of that numerical place. Suppose as an example that the first toothed rack is moved through 15 units of distance then the stepped disk 26 moves through a sufficient angular distance for the catch 27 to drop down the first step and half way toward the second step. The result is that the cross arm 16 is lowered through such a distance as to communicate to the rack 6 of the next numerical place a movement through one unit of distance. Thus by the employment of a stepped disk or of the stepped ring 26, the next following toothed rack, in contradistinction to what has been described with reference to the first method of carrying out the invention as illustrated in Figs. 1 to 3, is moved exactly through a distance corresponding to the number of units of the tens of the previous toothed rack, that is of the preceding numerical place. Moreover, the transmission of the movement of the toothed rack to the toothed segment 23 and from the latter to the counter itself is in this method of carrying out the invention materially simplified, since the parts do not have to be set forward and afterward set back. The sectors 21 and disks 19 are moreover dispensed with. With the present method of carrying out the construction illustrated at Figs. 4 to 7, a star 29 with 9 arms 30 at equal distances apart, is provided attached to the stepped disk 26. Each of the arms 30 is provided with a pin 31, which is adapted, when rotation takes place to come into the path of the jaws 33 and 35, which are pivoted together at 34. For example, suppose a toothed rack 6 is moved through 10 units of distance, then the star wheel 29 is turned through exactly one division. Suppose, again, that the toothed rack 6 is moved through 25 units of distance, then the star wheel 29 moves through 2.5 divisions and so the third arm comes into the way of the rack formed by the jaws 33 and 35. To one of the jaws, namely to the jaw 33 is connected the toothed segment 23 by means of a link 32, while the jaw 35 turns upon pivots 36 on a bar 37 which is actuated by the rod 38 and turns upon pivots 39 on the jaw 33. The jaw 33 is provided with 10 teeth or notches 40 coming in different positions but similarly shaped, and the jaw 35 is provided with ten teeth or notches 41. Suppose now that the star wheel 29 is set from the rack 6, then a pin 31 moves through a distance proportional to the number of units of distance through which the toothed rack 6 has been moved, and is brought into such a position, in the path of the jaws 33 and 35, that on actuating the rod 38 by suitable mechanism operated from the main spindle of the machine, the jaw 35 which turns upon the fixed pivot 34 is first moved forward such a distance that its corresponding step or notch 41 rests against the corresponding projection 31. When the arm 37 is further moved by the actuating rod 38, as the jaw 35 is kept still by the projection 31, the jaw 33 is moved by the arm 37 turning about the pivot 36, which is now fixed, until the corresponding notch 40 also catches against the pin 31, as shown at Fig. 6. This movement of the jaw 33 is communicated to the link piece 32 and consequently to the sector 23. The toothed sector 23 is raised into a position to engage the toothed wheel 24 for effecting the actuation of the counter by means of an arm 42 turning about pivots 43. As will be seen from Fig. 11 one of these mechanisms is provided for each numerical place. In this way the transmission of the movement is no longer effected by turning back the toothed segment that is indirectly, but directly through the setting of the toothed sector. There is this further and important advantage as compared with the first method of carrying out the invention, that it is no longer necessary to provide a special change mechanism for the counter for adapting it for subtraction or division. If, for instance, the counter, instead of being used for addition or multiplication, is to be used for subtraction or division, it is only necessary that the toothed segment 23 should be raised into engagement with the toothed wheel 24 upon the return movement instead of before the forward movement.

As, in both the first and second methods of carrying out the invention as regards the tens and units mechanism, the carrying over of the tens for multiplication is effected in the mechanisms themselves it follows that it is unnecessary to make the counter in the manner described in the specification of the original patent. It may be made like any ordinary counter with figure disks or rollers turned from the toothed segments 23 by means of intermediate gear wheels with which they can be rigidly coupled. The customary mechanism for carrying over the tens need only be provided for the counter, to make it possible for a number representing the result of a second calculation made by the machine to be added to one already on the counter, for instance in multiplication.

Figure 8:
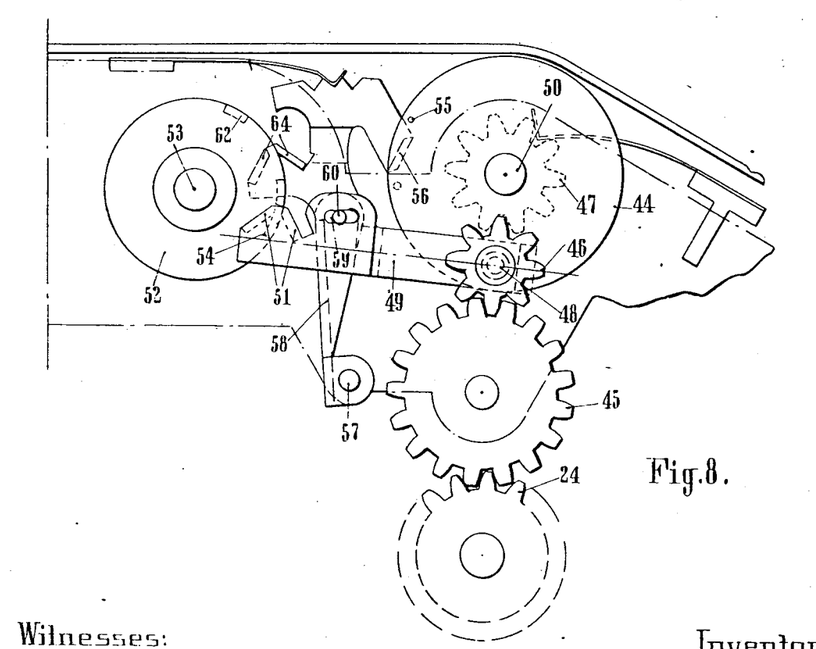
Fig. 8 shows to an enlarged scale the counter, illustrating the means for effecting the carrying over of the tens, in one position.
Figure 9:
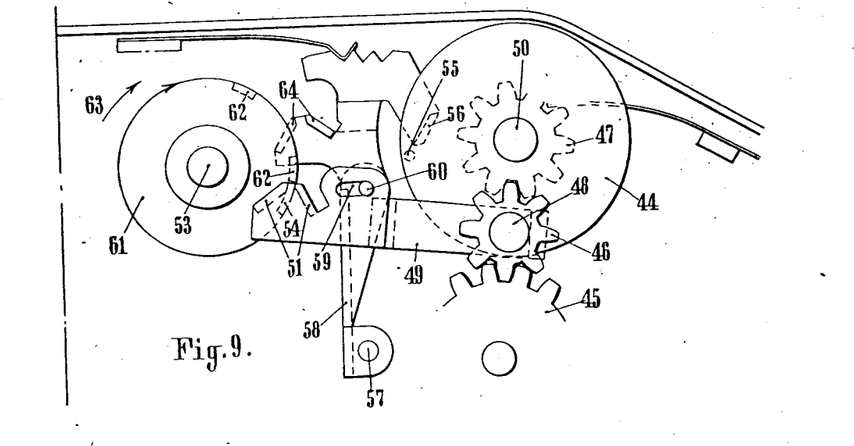
Figs. 9 and 10 are views of the operating parts in two other positions, to that shown at Fig. 8.
Figure 10:
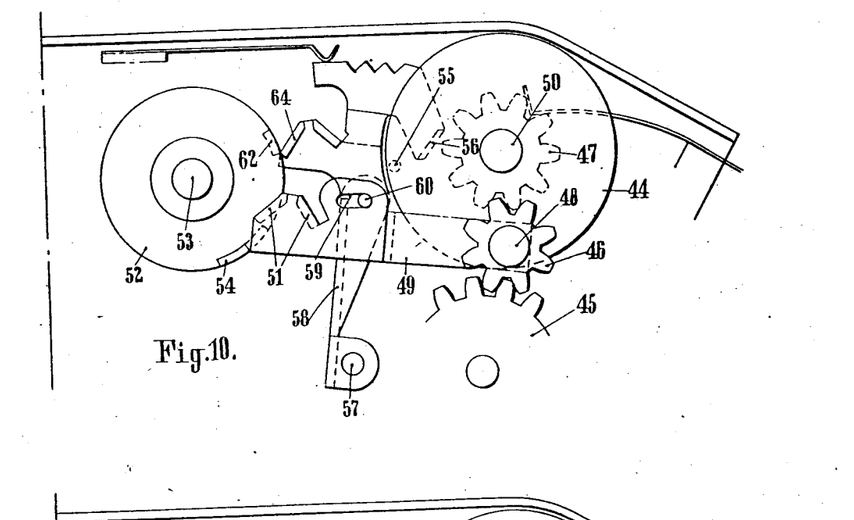

The important feature of the mechanism for carrying over the tens, illustrated at Figs. 8 to 11 of the drawings, consists of a construction in which a counter disk which is to carry over the tens to the next following disk turns a freely swinging sector, the completion of the carrying over of the tens being effected by the shift mechanism of the machine or from some other suitable moving part. 44 are the counter disks which are turned by toothed gearing 45, 46 47 from the toothed segment 23 through the intervention of the gear wheel 24. The gear wheel 45 is located on a shaft on the framework, and the wheel 46 on a pivot 48 upon the slide 49. The wheel 47 is on an axle 50 of the counter. If the wheel 45 is turned and the slide 49 is fixed, then the wheel 47 is turned by the wheel 46 through a corresponding distance. The fixing of the slide 49 in this position is effected by providing at the end thereof, a slot formed with beveled portions 51, into which engages a lateral projection 54 on the disk 52 in connection with the actuating mechanism of the machine. If the counter disk 44 comes into such a position that the digit 9 appears at the window, then a pin 55 provided on the counter disk comes into the position shown on the drawing at Fig. 8, and when further turning takes place it comes against the surface of the beveled edge 56 of a sector 58 turning on an axle 57, thus bringing the sector into the position shown at Fig. 9. The sector 58 is coupled with the slide 49 by the longitudinal slot 59 and the pin 60 engaging therein in such a way that it can swing freely with respect to the longitudinal direction of the slot and on swinging take with it the slide 49. Consequently on turning the counter disk 44 into the position shown at Fig. 9 the sector 58 is swung outward until the pin 60 comes against the right hand side of the slot 59. In this way the preparation for the carrying over of the tens is completed, and now if a disk 61 keyed on the shaft 53, which disk is provided with a side projection 62 is moved in the direction of the arrow 63 Fig. 9, then the side projection 62 comes against one of the sloping surfaces 64 on the sector 58 and the sector is moved farther to the right into the position shown at Fig. 10. In this way again the slide 49 being coupled to the sector 58 is carried along by the action causing the gear wheel 46 to roll upon the fixed toothed wheel 45, which thus turns the toothed wheel 47 through a corresponding distance. This completes the carrying over of the tens. It will be observed from Fig. 11 that the toothed wheel 46 in connection with the slide 49 of one numerical place rolls upon the gear wheel 45 to the next higher numerical place, and consequently turns the toothed wheel 47 of this numerical place. The restoration of the mechanism to the position shown in Fig. 8 is effected by turning back the shaft 53, which, it should be observed, is alternately rotated in opposite direction from some suitable part of the machine.

For instance in the case of a machine for effecting multiplication, the rotation is effected by moving the handle backward and forward each time it is required to effect the multiplication. This causes the projection 54 on the disk 52 to come against the slope 51 on the slide 49 drawing back this latter into the first position, the sector 58 being brought back in turn.

The method of operation in the case of subtraction that is where the wheels of the mechanism are turned in the opposite direction, is the converse of what has been described, and this follows from the symmetrical formation of the beveled surfaces 51 and 64.

Figure 12:
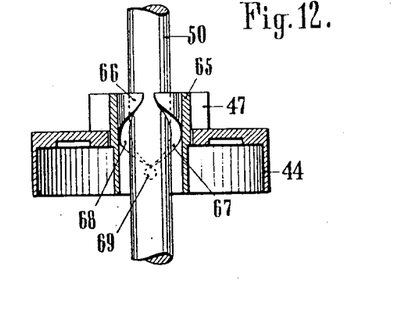
Fig. 12 is a section through one counter disk which shows a means for setting to zero all the coaxially mounted counter disks of the counter.

Fig. 12 is a section through a counter element in which the counter mechanism brings back the counter disk to zero by the axial movement of the axle 50. To effect this object, the hub 65 of the toothed wheels 47 which turn the counter spindles 44 is made hollow, and in it is located fixedly a casing, the outer surface of which is cut away in screw form so that two exactly symmetrical screw like surfaces 67 and 68 are produced. Within the axle 50 of the counter is a projecting pin 69 which comes against the surfaces 67 and 68 when the axle 50 is slid longitudinally. Consequently the housing 65 and also the counter disk 44, brought into the middle position shown at Fig. 12 is turned back, no matter to what number the ring 44 may be set. In this way it is possible, by longitudinal movement of the axle 50, to turn back to zero all the parts, which are provided in the same way with housing 66, this turning back being effected by the pressure of the pins against the housings due to the axial movement.

What I claim as my invention and desire to secure by Letters Patent of United States is:—

1. In a calculating machine the combination of counting mechanism comprising a number of figure drums, one for each numerical place, multiplicand and multiplier key mechanisms, an actuating member for each numerical place of the counter mechanism, a pivoted lever for each numerical place having means for setting it by the multiplicand key mechanism, a part coöperative with and adjustable relatively to each said lever, said part being operatively connected to the corresponding counter actuating member and having means for setting it from the multiplier key mechanism, and means for associating the operative mechanisms for adjacent numerical places adapted to cause the operating mechanism of a succeeding numerical place to be set by the mechanism of the next preceding numerical place through a distance equivalent to one tenth of that through which the mechanism of the preceding place is set.

2. In a calculating machine the combination of counting mechanism comprising a number of figure drums, one for each numerical place, multiplicand and multiplier key mechanisms, an actuating member for each numerical place of the counter mechanism, a pivoted lever for each numerical place having means for setting it by the multiplicand key mechanism, a part coöperative with and adjustable relatively to each said lever, said part being operatively connected to the corresponding counter actuating member and having means for setting it from the multiplier key mechanism, and means for associating the operative mechanisms for adjacent numerical places, comprising a part in connection with the operative mechanism of one numerical place, means for causing the said part to move proportionately to the movement of such operative mechanism and means for transferring this proportional movement to the operative mechanism of the next succeeding numerical place substantially as described.

3. In a calculating machine, the combination of counting mechanism comprising a number of figure drums one for each numerical place, actuating means for each numerical place of the counter mechanism, setting means for each numerical place of the counter mechanism and operatively associated with the counter actuating mechanism, multiplicand and multiplier keys mutually controlling the setting mechanisms and means for associating the operative mechanisms for adjacent numerical places, comprising a part in connection with each operative mechanism, such part being adapted to move, means in connection with the operative mechanism for regulating the amount of movement of the said part, and means for transferring such movement to another moving part in connection with the operative mechanism of the next succeeding numerical place, for the purpose set forth.

4. In a calculating machine, the combination of counting mechanism comprising a number of figure drums one for each numerical place, actuating means for each numerical place of the counter mechanism, setting means for each numerical place of the counter mechanism and operatively associated with the counter actuating mechanism, multiplicand and multiplier keys mutually controlling the setting mechanisms and means for associating the operative mechanism for adjacent numerical places, comprising a part in connection with each operative mechanism such part being adapted to move, a rotatable device in connection with the operative mechanism provided with a surface upon which a projection in connection with the moving part rests, such surface being formed in such a way that as the rotatable part is rotated a corresponding relative movement is communicated to the moving part, and means for transferring such movement to another moving part, in connection with the operative mechanism of the next succeeding numerical place.

5. In a calculating machine, the combination of counting mechanism, comprising a number of figure drums, one for each numerical place, actuating means for each numerical place of the counter mechanism, setting means for each numerical place of the counter mechanism and operatively associated with the counter actuating mechanism, multiplicand and multiplier keys mutually controlling the setting mechanism and means for associating the operative mechanism for adjacent numerical places, comprising a cross arm in connection with the operative mechanism of each numerical place except the last, a projection on such cross arm, a stepped cam-like disk, rotatably connected with the operative mechanism upon the surface of which cam like disk the aforesaid projection upon the cross arm rests, means for causing the cross arm to slide, and lever mechanism in connection with the cross arm adapted to transmit the motion of the cross arm to the operative mechanism of the next succeeding numerical place substantially as described.

6. In a calculating machine, the combination of counting mechanism comprising a number of figure drums, one for each numerical place, actuating means for each numerical place of the counter mechanism, setting means for each numerical place of the counter mechanism and operatively associated with the counter actuating mechanism, multiplicand and multiplier keys mutually controlling the setting mechanism, and means for associating the operative mechanisms for adjacent numerical places, comprising a cross arm in connection with the operative mechanism of each numerical place except the last, such cross arm being adapted to be pulled vertically downward by the action of a spring, a projection on said cross arm, a stepped cam like disk rotatably connected with the operative mechanism upon the surface of which cam like disk the aforesaid projection upon the cross arm rests, a slot in the horizontal arm of the cross arm, a bell crank lever provided at the end of one of its arms with a pin working in the aforesaid slot, the other arm of such bell crank lever being pivotally connected to a rack adapted to actuate the operative mechanism of the next succeeding numerical place substantially as described.

7. In a calculating machine, the combination of counting mechanism, comprising a number of figure drums one for each numerical place, actuating means for each numerical place of the counter mechanism, setting means for each numerical place of the counter mechanism, and operatively associated with the counter actuating mechanism, multiplicand and multiplier keys mutually controlling the setting mechanism, means for associating the operative mechanism for adjacent numerical places comprising a part in connection with the operative mechanism of each numerical place except the last, means for causing the said part to move proportionately to the movement of such operative mechanism, means for causing the moving part to be set back through a distance proportionate to that through which it has previously been set forward due to the number of units beyond a whole number of tens through which the previous mechanism has been moved, and means for transferring the proportional part of the movement due to the whole number of tens to the operative mechanism of the next succeeding numerical place substantially as described.

8. In a calculating machine, the combination of a counting mechanism comprising a number of figure drums one for each numerical place, actuating means for each numerical place of the counter mechanism, setting means for each numerical place of the counter mechanism, and operatively associated with the counter actuating mechanism, multiplicand and multiplier keys mutually controlling the setting mechanism, means for associating the operative mechanism for adjacent numerical places comprising a cross arm in connection with the operative mechanism of each numerical place except the last, such cross arm being adapted to be pulled vertically downward by the action of a spring, a projection on said cross arm, a rotatable device in connection with the operative mechanism provided with a surface upon which the projection in connection with the cross arm rests, such surface being formed in such a way that as the rotatable part is rotated a corresponding relative movement is communicated to the cross arm, a slot in the horizontal arm of the cross arm, a bell crank lever provided at the end of one of its arms with a pin working in the aforesaid slot, the other arm of such bell crank lever being pivotally connected to a rack adapted to actuate the operative mechanism of the next succeeding numerical place, and means for causing the rotatable part to be set back through a distance proportionate to that through which it has previously been set forward due to the number of units beyond a whole number of tens, such means comprising a circular grooved plate rotating with the counter actuating mechanism, a toothed ring rotating therewith and a disk-like sector provided with a recess, such recess engaging with the teeth of the toothed ring, the sectors for each numerical place being provided with progressively larger recesses, all substantially as described.

9. In a calculating machine, the combination of counting mechanism, comprising a number of figure drums one for each numerical place, actuating means for each numerical place of the counter mechanism, setting means for each numerical place of the counting mechanism, and operatively associated with the counter actuating mechanism, multiplicand and multiplier keys mutually controlling the setting mechanism, means for associating the operative mechanism for adjacent numerical places, comprising a rotatable part in connection with the operative mechanism of one numerical place, means for causing the said part to move proportionately to the movement of such operative mechanism, and means for transferring this proportional movement to the operative mechanism of the next succeeding numerical place, the means for transferring the setting of the operative mechanism to the counter comprising a star with nine arms rotating with the rotatable part in connection with the operative mechanism, a projecting pin on each arm of the star. two pivoted coöperating notched jaws adapted to grip a pin on one of the arms, means for operating the pivoted jaws, and suitable connecting links between the jaws and the actuating sector of the counter so that the counter is set according to the position in which the jaws are stopped by any particular projecting pin substantially as described.

10. In a calculating machine, the combination of counting mechanism comprising a number of figure drums one for each numerical place, means for carrying over the tens from the counter drum of one numerical place to that of the next place. comprising a freely swinging sector, a sliding plate provided with a slot in which works a pin on the aforesaid sector, a pair of sloping projections on said slide with an opening between them, another pair of sloping projections on the freely swinging sector also with an opening between them, a disk rotated by the actuating mechanism of the machine provided with projections adapted to engage with, work against, and between, the beforementioned slopes on the slide and swinging sector, another sloping portion on the sector adapted to be engaged by a pin on the counter disk once every revolution and a toothed pinion in connection with the slide by means of which a pinion on the counter drum and a pinion in connection with the operating mechanism of the corresponding numerical place can be intergeared, actuating means for each numerical place of the counter mechanism, setting means for each numerical place of the counter mechanism, and operatively associated with the counter actuating mechanism, multiplicand and multiplier keys mutually controlling the setting mechanisms and means for associating the operative mechanism for adjacent numerical places substantially as described.

11. In a calculating machine, the combination of counting mechanism, comprising a number of figure drums one for each numerical place, each of such drums being provided with a hollow casing mounted upon a central shaft. such shaft being adapted to be slid longitudinally, screw-like surfaces in each housing, a pin on the shaft for each housing. adapted when the shaft is slid longitudinally to move back each drum so that the zero indication may appear at the window, actuating means for each numerical place of the counter mechanism, setting means for each numerical place of the counter mechanism, and operatively associated with the counter actuating mechanism, multiplicand and multiplier keys mutually controlling the setting mechanisms, and means for associating the operative mechanism for adjusting numerical places substantially as described.

In testimony whereof, I affix my signature, in presence of two witnesses.

FRANZ RAUCHWETTER.

Witnesses:
   Henry Hasper,
   Woldemar Haupt.